United States Patent [19]

Klotz et al.

[11] Patent Number: 5,030,264
[45] Date of Patent: Jul. 9, 1991

[54] AIR INTAKE FILTER FOR AN INTERNAL COMBUSTION ENGINE

[75] Inventors: Arthur Klotz, Remseck; Peter Kupke, Steinheim; Rudolf Leipelt, Marbach, all of Fed. Rep. of Germany

[73] Assignee: Filterwerk Mann & Hummel GmbH, Ludwigsburg, Fed. Rep. of Germany

[21] Appl. No.: 483,746

[22] Filed: Feb. 23, 1990

[30] Foreign Application Priority Data

Apr. 6, 1989 [DE] Fed. Rep. of Germany ....... 3911153

[51] Int. Cl.[5] ............................................. B01D 46/00
[52] U.S. Cl. ......................................... 55/481; 55/502
[58] Field of Search ........................ 55/481, 497, 502

[56] References Cited

U.S. PATENT DOCUMENTS

| 3,712,033 | 1/1973 | Gronholz | 55/497 |
| 3,778,985 | 12/1973 | Daigle et al. | 55/502 |
| 3,815,754 | 6/1974 | Rosenberg | 55/497 |
| 4,438,057 | 3/1984 | Sundseth | 55/482 |
| 4,925,469 | 5/1990 | Clement et al. | 55/497 |

FOREIGN PATENT DOCUMENTS

| 2512724 | 2/1979 | Fed. Rep. of Germany . |
| 2034160 | 12/1970 | France . |
| 2188064 | 1/1974 | France . |
| 55-164765 | 12/1980 | Japan | 481/ |
| 61-291016 | 12/1986 | Japan | 55/502 |
| 2106634 | 4/1983 | United Kingdom . |

Primary Examiner—Jay H. Woo
Assistant Examiner—C. Scott Bushey
Attorney, Agent, or Firm—Foley & Lardner

[57] ABSTRACT

An air intake filter for internal combustion engines has a flat, replaceable filter insert through which air passes transversely in operation, and which can be inserted from one side into a filter housing. The filter insert has a gasket arranged on its periphery for sealing an end face of the filter insert against a lip on the filter housing. Sealing pressure is exerted by ledges on lateral portions of the filter housing which slant toward the filter insert in the direction of insertion. To prevent the gasket from being displaced laterally with respect to the lip on the filter housing when the sealing pressure is applied, the filter insert is received in a substantially open-faced frame. The frame has a closure member which is provided with abutments which engage on one side against the slanting ledges of the lateral portions of the filter housing and engage on the other side against the frame, and which can be pushed in the direction of insertion of the filter insert to a lockable closed position in which it exerts a sealing pressure on the filter gasket.

7 Claims, 3 Drawing Sheets

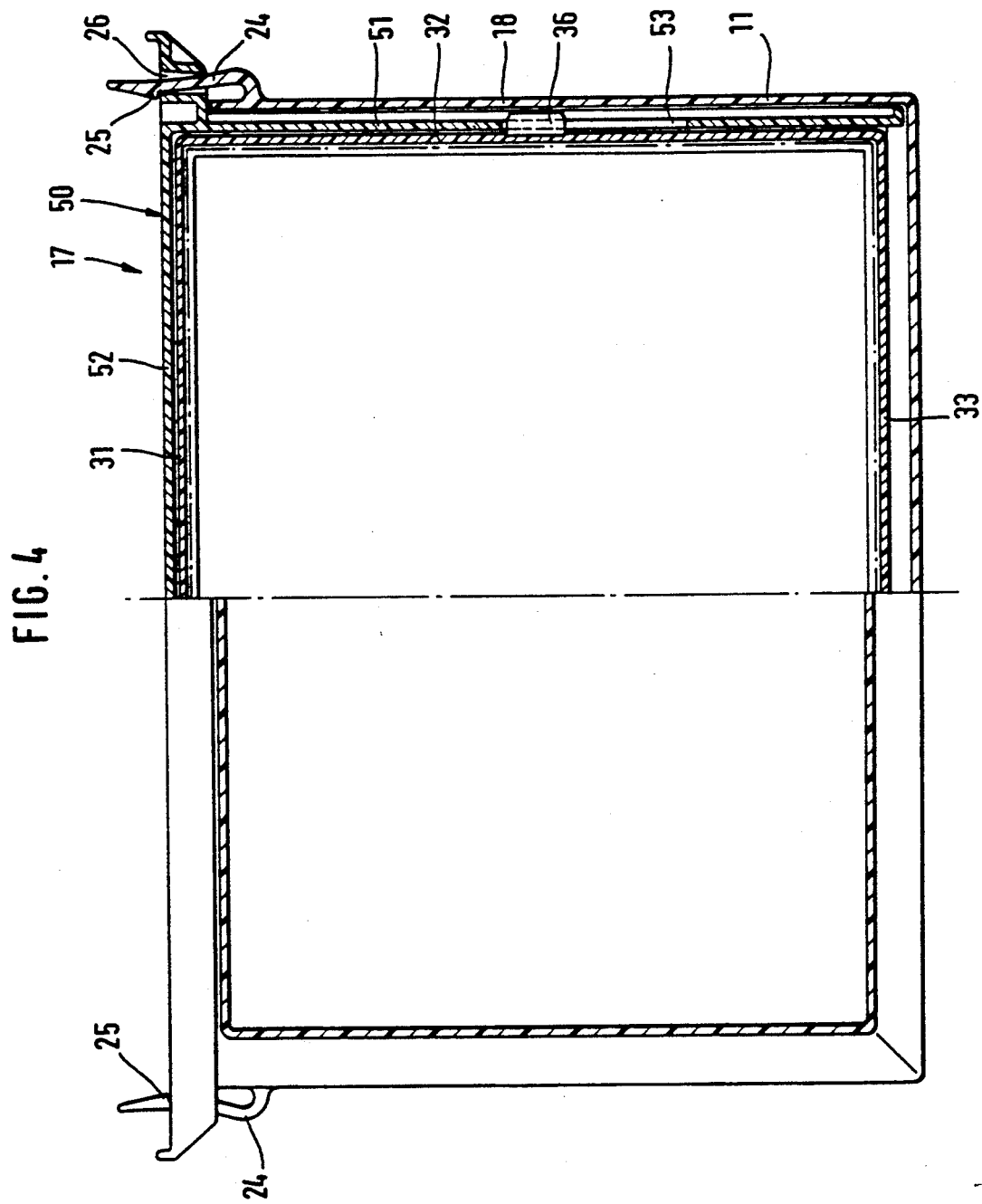

AIR INTAKE FILTER FOR AN INTERNAL COMBUSTION ENGINE

BACKGROUND OF THE INVENTION

The present invention relates to an air intake filter for an internal combustion engine which comprises a flat, replaceable filter insert through which air passes transversely in operation, and which has a gasket arranged around its circumference for sealing the face of the filter against a lip of the filter housing, and which is insertable from one side into the filter housing, wherein a sealing pressure is exerted by means of ledges on lateral portions of the filter housing which slant toward the filter insert in the direction of insertion.

In a filter of this kind disclosed in German Patent No. DE 25 12 724, the filter insert itself has slanting lateral portions provided on both sides which rest against slanting ledges on the lateral portions of the filter housing. This arrangement has the disadvantage that, when the sealing pressure is applied, the gasket itself and the sealing seat are displaced sideways relative to each other, resulting in wear. This gives rise to the danger that the gasket will be damaged or will separate from the filter insert.

SUMMARY OF THE INVENTION

It is the object of the invention to provide an improved air filter for an internal combustion engine.

It is also an object of the invention to provide an air filter which achieves a complete seal with simple structural means.

Yet another object of the invention is to provide an air filter which avoids sideways displacement of the filter insert sealing ring with respect to the sealing surface of the housing.

These and other objects are achieved in accordance with the invention, by providing an air intake filter for an internal combustion engine comprising a flat, replaceable filter insert through which air passes transversely in operation, and which has a gasket arranged around the circumference of one end face of the filter for sealing the face of the filter against a lip on the filter housing, and which is insertable from one side into the filter housing, whereby a sealing pressure is exerted by means of ledges on lateral portions of the filter housing which slant toward the filter insert in the direction of insertion, wherein the filter insert is replaceably received in a substantially open-faced frame which has a gas-closure member which is provided with abutment means which engage on one side against the slanting ledges on the lateral portions of the filter housing and on the other side against the frame and the closure member can be displaced in the direction of insertion of the filter insert to a lockable closed position in which it exerts a force against the slanting ledges of the lateral portions of the filter housing and against the frame in which the filter insert is received in order to apply a sealing pressure between the gasket of the filter insert and the housing lip.

The filter insert is thus pressed, without sideways displacement, by the closure member through the frame against a lip of the filter housing in order to seal the face of the filter against the lip of the housing. Since the frame and the closure member themselves do not need to sealingly engage each other at any point, they may be constructed of materials which will readily permit the closure member to slide freely along on the frame and along the slanted ledge of the filter housing.

In accordance with one preferred embodiment of the invention, an especially simple design is achieved by providing the closure member with two sliding wedges which straddle the sides of the frame and which are fixedly joined to each other by a cover part.

According to a further preferred embodiment of the invention, the sliding wedges and the adjacent lateral frame parts are joined together for limited longitudinal displacement by means of slots extending in the direction of insertion of the filter insert and projections which engage in the slots.

So that the frame and closure member will remain together in the assembled position, the projections may be provided with catches and be snapped into the slots.

BRIEF DESCRIPTION OF THE DRAWINGS

The invention will be explained in further detail with reference to a preferred embodiment illustrated in the accompanying drawings in which:

FIG. 4 is a partial cross-section through the air intake filter, taken along line 4—4 of FIG. 1.

DETAILED DESCRIPTION OF PREFERRED EMBODIMENTS

Figure 1:
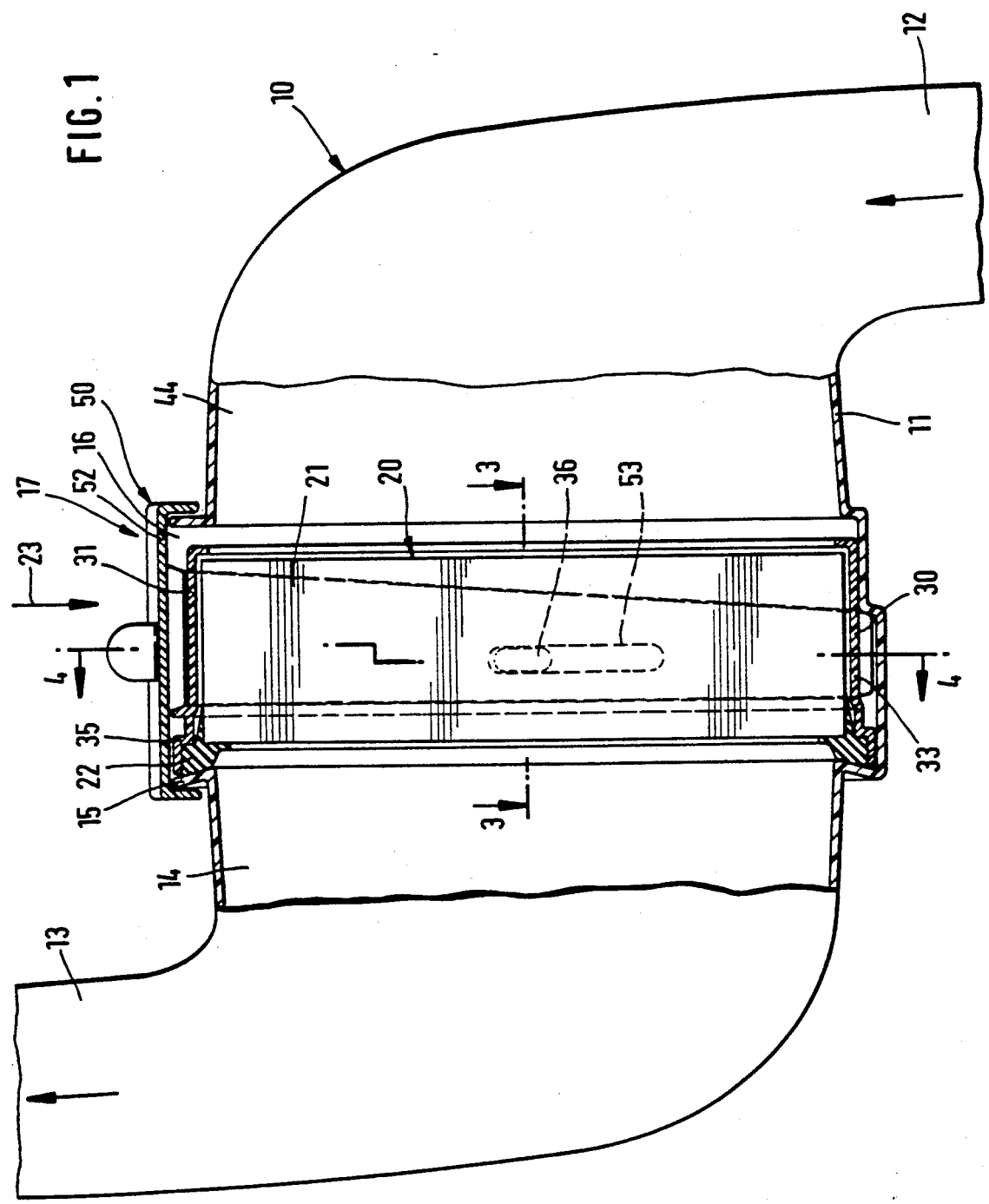
FIG. 1 is a longitudinal section through an air intake filter with a filter insert sealingly pressed in the closed position.

The air intake filter 10 comprises a filter housing 11 made of plastic into which an intake duct 12 leads from below and out of which a clean air duct 13 extends upwardly.

A rectangular filter insert 20 is provided which comprises a pleated filter paper strip 21 which is provided on the circumference with a gasket 22. At the cut edges of the filter paper strip 21 the adjacent surfaces are cemented together to create filter pockets which are open on the clean-air side. Within the filter housing 11 the filter insert 20 separates a clean-air chamber 14 from a raw air chamber 44.

The filter insert 20 is removably inserted into a substantially open-faced frame 30 which likewise is formed of plastic. Its sides 31, 32 and 33 have a ledge 35 disposed at the same level, which lies against the gasket 22 of the filter insert 20. As described hereinafter, the gasket 22 is sealingly pressed by the frame 30 against a lip 15 of the filter housing 11.

The lateral portions 32 of frame 30 extending in the direction of insertion 23 are provided with projections 36 which have catch claws 37.

A closure member 50 is provided comprising two sliding wedges 51 which straddle the sides of the frame 30 and which are fixedly joined to each other by a cover part 52. In the closed position shown in FIGS. 1 and 4, the cover part 52 closes an opening 16 in the narrow side 17 of the filter housing 11. The filter insert 20 with the frame 30 can be installed and removed through the opening 16.

Each sliding wedge 51 is provided with a slot 53 extending in the direction of insertion 23 of the filter insert 20. The projections 36 of the lateral portions 32 of frame 30 enter into the slots 53, and the catch claws 37 catch on the back of the wall of the sliding wedges.

Frame 30 and closure member 50 with the sliding wedges 51 are thus connected together for limited longitudinal displacement.

Lateral portions 18 of the filter housing 11 comprise ledges 19 which slant in the direction of insertion 23 toward the filter insert 20. The sliding wedges 51 rest on the one side with their edges 54 abutting against the ledges 19 of the filter housing 11, and on the other side with their edges 55 abutting against projecting beads 38 on the lateral portions 32 of the frame 30.

Resilient tongues 24 with catches 25 are disposed on the filter housing 11. In the closed position, the tongues 24 project through openings 26 in the cover part 52 of the closure member 50, and the catches 25 hold the closure member 50 tightly in this position.

Figure 2:
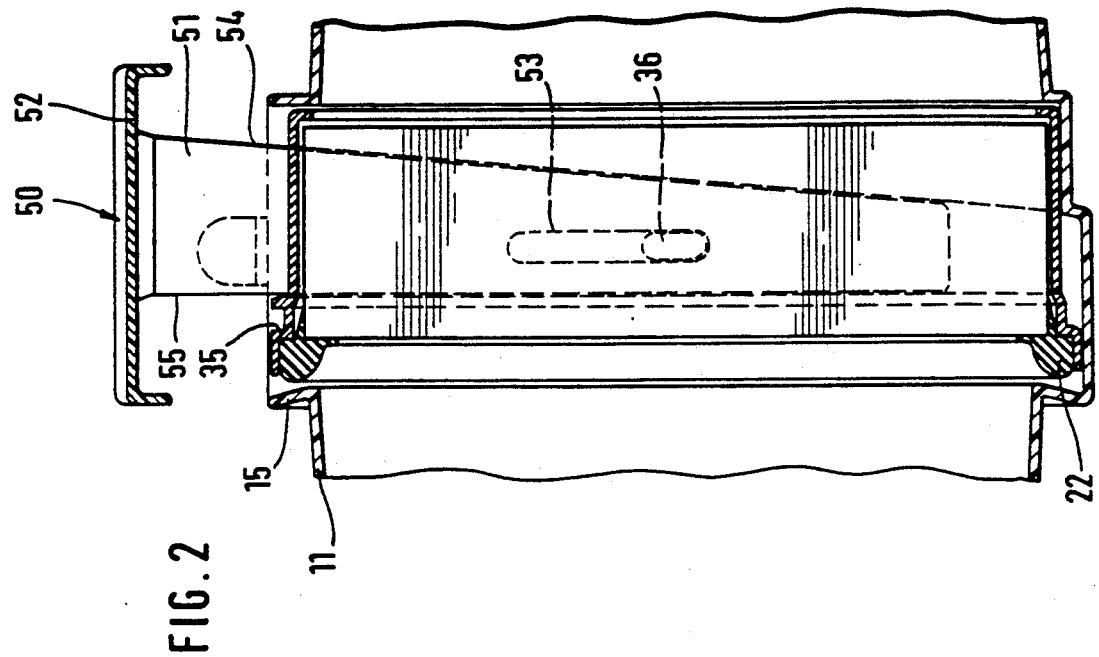
FIG. 2 is a cross section of the air intake filter of FIG. 1 with the closure means in another position.
Figure 3:
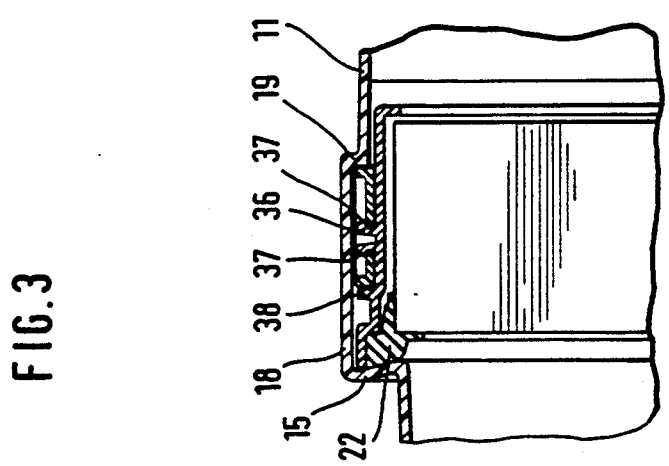
FIG. 3 is a partial cross-section taken along line 3—3 of FIG. 1.

In order to install a filter insert, the tongues 24 of the filter housing 11 are pushed laterally outwardly so that the catches 25 release the cover 52. The closure member can then be withdrawn from the filter housing. In the partly open position shown in FIG. 2, the filter insert 20 and frame 30 are still in the filter housing 11, while the closure member 50 is partly withdrawn. The gasket 22 has backed slightly away from the lip 15 of filter housing 11.

As the withdrawal of the closure member 50 continues, frame 30 is also moved through opening 16 out of the filter housing by means of the slots 53 and the projections 36 which engage in the slots 53.

A new filter insert 20 can now be inserted into the frame 30 such that its gasket 22 lies against the ledge 35 of frame 30. Filter insert 20 together with frame 30 and closure member 50 are now pushed back into the filter housing in reverse order until the closed position shown in FIGS. 1 and 4 is finally reached. In this closed position the sliding wedges 51 engage with their edges 54 against the ledges 19 of the lateral portions 18 of the filter housing and with their edges 55 against the bead 38 of the frame 30, and the frame in turn, with its ledge 35, presses the gasket 22 against the lip 15 of the filter housing and thus exerts the necessary sealing pressure.

The raw air enters in the direction of the arrow through the intake duct 12 into the filter housing 11, passes through the filter insert 20 from the raw air chamber 44 to the clean air chamber 14 and leaves the filter housing through the clean air duct 13 to the internal combustion engine.

The foregoing description and examples have been set forth merely to illustrate the invention and are not intended to be limiting. Since modifications of the described embodiments incorporating the spirit and substance of the invention may occur to persons skilled in the art, the scope of the invention should be construed to embrace all variations which fall within the ambit of the appended claims and equivalents.

What is claimed:

1. An air intake filter for an internal combustion engine comprising:
   a filter housing;
   a flat, replaceable filter insert for filtering air passing transversely therethrough, said filter insert being insertable from one side into said filter housing;
   a gasket arranged circumferentially around a face of said filter insert for sealing said face against a sealing surface of said filter housing;
   a pair of slanting ledges on lateral portions of said filter housing which slant toward said filter insert in the direction of insertion of said filter insert;
   a substantially open-faced frame in said filter housing for replaceably receiving said filter insert when said filter insert is inserted into said filter housing; and a closure member which is movable in the direction of insertion of said filter insert to a closed position; said closure member engaging on one side against said slanting ledges and engaging on the other side against said frame;
   whereby when said closure member is displaced in the direction of filter insertion to said closed position, the gasket of a filter insert received in said frame is pressed against said sealing surface of said filter housing in order to seal said filter insert against said filter housing.

2. An air intake filter for an internal combustion engine comprising:
   a filter housing;
   a flat, replaceable filter insert for filtering air passing transversely therethrough, said filter insert being insertable from one side into said filter housing;
   a gasket arranged circumferentially around a face of said filter insert for sealing said face against a sealing surface of said filter housing;
   a pair of slanting ledges on lateral portions of said filter housing which slant toward said filter insert in the direction of insertion of said filter insert;
   a substantially open-faced frame in said filter housing for replaceably receiving said filter insert (20) when said filter insert is inserted into said filter housing; and
   a closure member (50) which is movable in the direction (23) of insertion of said filter insert (20) to a closed position; said closure member comprising a pair of sliding wedges laterally straddling said frame, which are fixedly joined to each other by a cover part, and said closure member engaging on one side against said slanting ledges (19) and engaging on the other side against said frame (30);
   whereby when said closure member is displaced in the direction of filter insertion to said closed position, the gasket of a filter insert received in said frame is pressed against said sealing surface of said filter housing in order to seal and filter insert against said filter housing.

3. An air intake filter according to claim 2, wherein each sliding wedge is displaceably to an adjoining lateral frame portion by means of a projection on one of said wedge and said frame portion, said projection engaging in a slot in the other of said wedge and said frame portion which extends in the direction of insertion of the filter insert.

4. A air intake filter according to claim 3, wherein said projections are formed on said frame portions, and said slots are formed in said sliding wedges.

5. An air intake filter according to claim 3, wherein said projections are provided with catches and are snapped into said slots.

6. An air intake filter according to claim 1, further comprising means for locking said closure member in said closed position.

7. An air intake filter according to claim 2, wherein said sealing surface of said filter housing comprises a lip extending peripherally around said housing.

* * * * *